(12) United States Patent
Halford (10) Patent No.: US 10,759,104 B2
(45) Date of Patent: Sep. 1, 2020

(54) ASSEMBLY AND METHOD FOR MANAGING THE TEMPERATURE OF A MOULD TOOL

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 684 days.

(21) Appl. No.: 14/771,477

(22) PCT Filed: Mar. 4, 2014

(86) PCT No.: PCT/GB2014/050632
§ 371 (c)(1),
(2) Date: Aug. 28, 2015

(87) PCT Pub. No.: WO2014/135857
PCT Pub. Date: Sep. 12, 2014

(65) Prior Publication Data
US 2016/0001481 A1     Jan. 7, 2016

(30) Foreign Application Priority Data
Mar. 4, 2013   (GB) .................................. 1303845.0

(51) Int. Cl.
*B29C 45/73*        (2006.01)
*B29C 33/04*        (2006.01)
(Continued)

(52) U.S. Cl.
CPC .......... *B29C 45/7312* (2013.01); *B29C 33/04* (2013.01); *B29C 35/0288* (2013.01);
(Continued)

(58) Field of Classification Search
None
See application file for complete search history.

(56) References Cited

U.S. PATENT DOCUMENTS 2,689,372 A  *  9/1954  Goulding, Jr. .......... B29B 13/00
                                                    165/48.1
3,043,017 A  *  7/1962  Strickland ............. B29C 33/046
                                                    34/104
(Continued)

FOREIGN PATENT DOCUMENTS

WO          2013021195 A2     2/2013
WO     WO 2013021195    *     2/2013
(Continued)

OTHER PUBLICATIONS

International Search Report in PCT/GB2014/080632 dated Jun. 18, 2014.
(Continued)

*Primary Examiner* — Seyed Masoud Malekzadeh
*Assistant Examiner* — Manley L Cummins, IV
(74) *Attorney, Agent, or Firm* — Young Law Firm, P.C.

(57) ABSTRACT

A mould tool (100) defining a workpiece profile has a first fluid-based temperature control assembly configured to control the temperature of the mould tool (100) which exhausts to a peripheral chamber (160) proximate the periphery of the workpiece profile (100) to reduce a temperature difference between the mould tool (100) and the surrounding environment.

19 Claims, 6 Drawing Sheets

(51) Int. Cl.
*B29C 35/02* (2006.01)
*B29C 35/04* (2006.01)
*B29C 35/16* (2006.01)
*F28D 15/00* (2006.01)
*B29C 33/02* (2006.01)
*B29C 45/27* (2006.01)

(52) U.S. Cl.
CPC ............ *B29C 35/045* (2013.01); *B29C 35/16* (2013.01); *F28D 15/00* (2013.01); *B29C 35/0294* (2013.01); *B29C 45/2737* (2013.01); *B29C 45/73* (2013.01); *B29C 2033/023* (2013.01); *B29C 2033/042* (2013.01); *B29C 2035/1658* (2013.01); *B29K 2995/0015* (2013.01)

(56) References Cited

U.S. PATENT DOCUMENTS

| | | | | |
|---|---|---|---|---|
| 3,081,488 A * | 3/1963 | Casavina | ............ | B29C 44/445 249/79 |
| 3,265,530 A * | 8/1966 | Marzocchi | ............ | B29C 33/04 156/222 |
| 4,053,126 A * | 10/1977 | Duret | ............ | B29C 33/04 244/119 |
| 4,431,397 A * | 2/1984 | Fried | ............ | B29C 33/34 249/137 |
| 4,621,995 A * | 11/1986 | Wersosky | ............ | B29C 33/046 137/625.33 |
| 4,623,503 A * | 11/1986 | Anestis | ............ | B29C 33/046 264/302 |
| 4,867,660 A * | 9/1989 | Nagase | ............ | B29C 33/046 425/4 R |
| 5,106,285 A * | 4/1992 | Preston | ............ | B29C 33/04 137/605 |
| 5,221,539 A * | 6/1993 | Pallerberg | ............ | B29C 33/04 264/302 |
| 5,443,777 A * | 8/1995 | Mills | ............ | B29C 33/046 264/255 |
| 5,830,515 A * | 11/1998 | Pleasant | ............ | B29C 45/7312 425/192 R |
| 5,993,721 A * | 11/1999 | Kurihara | ............ | B29C 49/20 264/40.1 |
| 2002/0162940 A1* | 11/2002 | Frul | ............ | B29C 33/04 249/79 |
| 2005/0035115 A1* | 2/2005 | Anderson | ............ | B29C 33/04 219/759 |
| 2005/0115955 A1* | 6/2005 | Huang | ............ | B29C 43/52 219/548 |
| 2005/0184416 A1* | 8/2005 | McCollum | ............ | B29C 45/37 264/40.5 |
| 2009/0011063 A1* | 1/2009 | Davie | ............ | B29C 33/02 425/144 |
| 2009/0071217 A1* | 3/2009 | Matsen | ............ | B21D 37/16 72/342.3 |

FOREIGN PATENT DOCUMENTS

WO      2013034892 A1    3/2013
WO  WO 2013034892    *    3/2013

OTHER PUBLICATIONS

U.K. Patents Act 1977: Search Report under Section 17(5) dated Sep. 4, 2014.

* cited by examiner

ASSEMBLY AND METHOD FOR MANAGING THE TEMPERATURE OF A MOULD TOOL

BACKGROUND

The present invention is concerned with the management of temperature of a mould tool. More specifically the present invention is concerned with management of the temperature of a mould tool which utilises fluid heating and cooling, in particular to reduce the thermal losses of the edge zones of the mould tool.

Fluid heating of layered mould tools is known, in particular from the applicant's earlier application published as WO 2013/021195. In this document, fluid-based heating of the mould tool face in order to control the curing properties of the workpiece is discussed, whilst the control circuitry and delicate componentry of the mould tool is protected from excessive temperatures through the tool's layered structure. When this type of heating is used it is desirable to limit the amount of heat lost to the surrounding environment through the mould tool.

Zone control of tool temperature is also known, in particular from the applicant's earlier application published as WO 2011/048365. In this document, heating and cooling means are independently associated with each tool "pixel"—which may be defined as described below.

In one embodiment of WO 2011/048365 each heated/cooled tool pixel has an independent in-line heater/cooler associated therewith, comprising an internal channel in each tool pixel below the tool surface through which a heating/cooling fluid is passed. The pixels are arranged to tessellate to form the tool surface at their upper surface.

Heat loss can be characterized in the three axes of the mould tool: X, Y and Z, (X and Y in the lateral direction, and Z in the vertical direction). Mould tools may be designed so that the predominant direction for heat transfer is towards the mould face (i.e. +Z), to mitigate heat losses in the −Z direction. However, the region of greatest heat lost from the tool is at its periphery (in the lateral directions X, Y), generally termed the mould tool edge zone, where a greater proportion of the tool is exposed to ambient air. Thus temperature control of the mould tool edge zone can be difficult to manage due to these losses.

Whilst it is possible to operate the heating means associated with the pixels located in the edge zone at a higher temperature than those pixels located in the centre of the mould tool, to account for these losses, this clearly is not an efficient solution and is unworkable when a maximum temperature is required across the entire mould face.

The importance of good temperature management of the tool surface in the tool edge zones is evident, as commonly parts need the tightest tolerances at their edges, which form interfaces with other parts. Furthermore parts may commonly have their deepest section at their edges, to provide the necessary structural rigidity of the part to be formed, examples include the "tray-like" castings for mobile phone, laptop computer or tablet computer cases.

It is an aim of the present invention to overcome or at least mitigate one or more of the above problems.

BRIEF DESCRIPTION OF THE DRAWINGS

An example mould tool heat management system in accordance with the present invention will now be described with reference to the appended drawings in which.

DETAILED DESCRIPTION

According to a first aspect of the invention there is provided a mould tool assembly comprising: a mould tool having: a workpiece profile surface, the workpiece profile surface defining a workpiece profile having a periphery, and a temperature control surface opposite the workpiece profile, the temperature control surface at least partially bounding a fluid chamber, the fluid chamber having an exhaust; a first fluid-based temperature control assembly configured to control the temperature of the mould tool by directing fluid into the fluid chamber; and a peripheral chamber arranged outside the periphery of the workpiece profile, which peripheral chamber is fed by the fluid exhaust, wherein the peripheral chamber is configured to urge a fluid flow from the fluid exhaust in the direction of the workpiece profile surface.

Advantageously, the peripheral chamber acts to reduce the temperature difference between the workpiece profile and the surrounding environment, thus reducing the losses during heating. The addition of the peripheral chamber provides a lower surface area to volume ratio, as the tool effectively "grows" in the three dimensions. This advantageously supports heating of the mould tool as a greater proportion of thermal energy can be imparted to the tool via the heating fluid for a relatively lower proportion of thermal energy "lost" through radiation to the atmosphere surrounding the tool. The use of the fluid exhaust in this way also provides a more efficient mould tool system.

The mould tool may be divided into a plurality of zones, the plurality comprising a central zone and an edge zone, wherein the first fluid-based temperature control assembly is arranged to control the temperature of the central zone, and wherein the peripheral chamber is proximate an outer edge of the edge zone. Advantageously using the hot exhaust from the well insulated central zones boosts the insulating properties of the peripheral chamber.

Preferably the mould tool comprises a plurality of peripheral chambers, each in fluid communication with the exhaust, the plurality of peripheral chambers arranged proximate an outer edge of the edge zone. Advantageously this allows for convenient packaging arrangement of the exhaust fluid routing whilst allowing specific edge portions to benefit from the insulating effects of the peripheral chamber.

The plurality of peripheral chambers may be arranged substantially along each side of the outer edge of the edge zone. Alternatively the plurality of peripheral chambers may be arranged substantially at a corner of two adjacent sides of the outer edge of the edge zone. Advantageously the arrangement of the mould tool may be designed according to the requirements of the workpiece to be formed.

The peripheral chamber may define a waste-gate in the region of the workpiece profile surface. Advantageously this allows an "express dump" of exhaust fluid which can be effected passively e.g. through pressure/temperature release systems or actively e.g. through timing/temperature/pressure control systems. Active mould tool control systems are commonly incorporated on mould tools having longer duration cycle times, whereas passive mould tool control systems are incorporated on mould tools having shorter duration cycle times, where it is expected that the tool may undergo many more cycles during its operational life. The waste-gate located in the region of the workpiece profile enables a quicker transition between the different temperatures demanded at the tool face.

Preferably the mould tool comprises a plurality of first fluid-based temperature control assemblies directing fluid into a plurality of fluid chambers. Advantageously this arrangement allows different fluid chambers to be set at different temperatures. This is particularly beneficial for moulding processes requiring temperature variations across the mould tool, for example to induce resin flow in a particular direction in a carbon composite component. Conversely, this arrangement also allows different fluid chambers to be set at the same temperature even if the different fluid chambers are experiencing different heat loss conditions.

Preferably the plurality of fluid-based temperature control assemblies are arranged opposite each other to mirror the temperature changes across the workpiece. Alternatively the mould tool is arranged to mix the fluid directed into the plurality of fluid chambers from the plurality of first fluid-based temperature control assemblies. Advantageously this provides a homogenous exhaust fluid to help maintain an even mould tool temperature.

Preferably the peripheral chamber defines an external wall, a base and an internal wall, said internal wall extending from said base towards the workpiece profile surface, substantially parallel with said external wall. Preferably still the exhaust of the fluid chamber is located substantially towards the base of the peripheral chamber. This arrangement provides a beneficial route for the exhaust flow.

Preferably the peripheral chamber defines an external wall, a base and a gutter, said gutter extending between the external wall and the periphery of the workpiece profile and running from the centre of the base of the peripheral chamber towards the corner of two adjacent sides of the outer edge of the edge zone. This arrangement beneficially directs the flow of exhaust towards the corners of the mould tool.

Preferably the mould tool comprises a flow diverter arranged to influence the exhaust flow to selectively at least partially bypass at least part of the peripheral chamber.

Preferably the flow diverter is located in the internal wall of the peripheral chamber, in use substantially preventing exhaust flow towards the workpiece profile surface. This arrangement allows simple manipulation of the peripheral chamber to prevent exhaust fluid delivery to the peripheral chamber in the region of the workpiece profile surface.

Preferably the flow diverter is a valve. Preferably the valve is responsive to a flow and/or pressure of the exhaust flow. Preferably the valve is configured to increase bypass flow upon a rise in exhaust flow rate and/or pressure. Advantageously this allows specific control over the heat loss at the edges of the tool.

The first fluid-based temperature control assembly may comprise an in-line air heater.

The mould tool may further comprise a second fluid-based temperature control assembly arranged in the peripheral chamber. This arrangement advantageously allows a further injection of thermal energy in the exhaust flow as it is routed towards the workpiece profile surface. Alternatively this arrangement allows cooling of the peripheral chamber when the mould tool requires cooling.

Preferably the exhaust from the peripheral fluid chamber is re-routed to the inlet of the second fluid-based temperature control assembly. Advantageously this arrangement allows further re-cycling of the exhaust fluid, which may be beneficially hotter or cooler than the ambient air otherwise drawn into the second fluid-based temperature control assembly.

The mould tool may further comprise a radiator connected in series with the in-line heater.

According to a second aspect of the invention there is provided a method of managing the temperature of a mould tool comprising the steps of: providing a mould tool having a workpiece profile surface, the workpiece profile surface defining a workpiece profile having a periphery; and a temperature control surface at least partially bounding a fluid chamber, the fluid chamber having an exhaust; providing a workpiece in contact with the workpiece profile surface, providing a first fluid-based temperature control assembly, controlling the temperature of the mould tool by directing fluid into the fluid chamber using the first fluid-based temperature control assembly, providing a peripheral chamber outside the periphery of the workpiece profile, feeding the peripheral chamber with the fluid exhaust and urging the exhaust fluid flow in the direction of the workpiece profile surface.

Preferably the method comprises the step of heating and or cooling the fluid between the first fluid-based temperature control assembly and the peripheral chamber.

Preferably the method comprises the step of pumping the fluid between the first a fluid-based temperature control assembly and the peripheral chamber.

According to a third aspect of the invention there is provided a method of manufacturing a moulded component comprising the method of the second aspect of the invention and the step of using the mould tool to mould a component.

Figure 1:
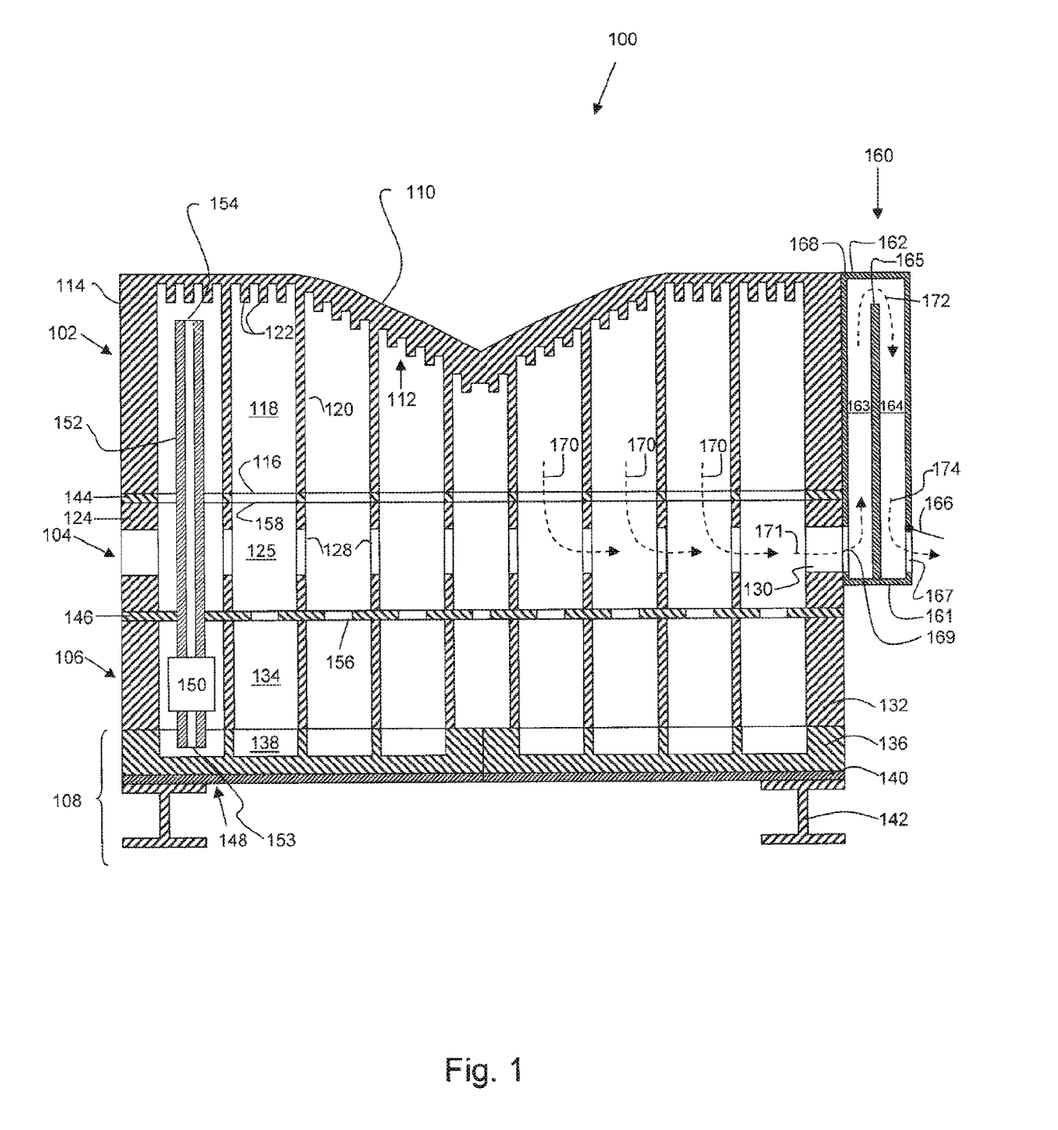
FIG. 1 is a schematic view of a first embodiment of a mould tool heat management system in accordance with the present invention.

Referring to FIG. 1, a tool 100 comprises a first layer 102, an second layer 104, a third layer 106, a support assembly 108 and a peripheral fluid chamber 160.

The first layer 102 comprises a tool face 110. The tool face 110 reflects the shape of a workpiece to be formed, and in use is associated with an opposing tool (not shown). On the underside of the tool face 110, a temperature control surface 112 is defined as will be described below.

The first layer 102 is surrounded by a peripheral wall 114 so as to define an enclosed volume. The first layer 102 defines a number of discrete chambers 118 which are bound by a part of the temperature control surface 112 at a first end and open at a second end 116. The chambers 118 are separated by chamber walls 120 which extend from the temperature control surface 112 to the open ends 116. As such, the first layer 102 defines a type of honeycomb structure comprising a number of discrete cell-like chambers 118.

The temperature control surface comprises a number of ribs 122. The ribs provide a large surface area of the temperature control surface fro the fluid within the chamber 118 to contact and thereby encourage heat transfer between the fluid and the temperature control surface 112. As such, any fluid instant in the chamber 118 will influence the temperature of the tool face 110 by conduction through the first layer 102.

The second layer 104 comprises a block 124 having a number of through bores 125 defined therein. Adjacent through bores 125 are in fluid communication via internal ports 128. The through bores proximate the periphery of the block 124 define exhaust ports 130 in fluid communication with the through bores 125.

The third layer 106 comprises a block 132 having a series of through bores 134. Each of the through bores 134 contains mounting apparatus for an inline air heater (as will be described below).

The peripheral fluid chamber 160 comprises a hollow block 168 having an internal wall 165 which extends from a first end 161 to short of a second end 162, creating two chambers side-by-side in fluid communication, exterior chamber 164 enveloping interior chamber 163. Interior chamber 163 includes port 169 positioned proximate first end 161 and exterior chamber 164 includes port 167, similarly positioned proximate first end 161. External valve 166 is mounted in port 167.

The support assembly 108 comprises a sealing plate 136 having a plurality of blind bores 138 defined therein, a support plate 140 and a plurality of I-beams 142.

In addition to the above mentioned components a first gasket 144 and a second gasket 146 are provided.

The tool 100 is assembled as follows.

The I-beams 142 form a reaction structure for the tool such that any compressive loads imparted by the opposing tool (not shown) upon the tool face 110 can be reacted. The support plate 140 is mounted on I-beams 142 and the sealing plate 136 is positioned on top of the support plate 140 as shown in FIG. 1. The third layer 106 is then mounted to the support plate such that each of the through bores 134 aligns with a respective blind bore 138 of the seal plate.

An inline air heater 148 is provided having heater assembly 150, and elongate tube section 152 and an outlet 154. The heater assembly 150 is mounted within the third layer 106 with a through bore 134. It will be noted that a plurality of such heaters are installed into each of the through bores 134. Upwardly projecting thermocouples will also be installed.

The second gasket is placed on top of the third layer 106. The second gasket 146 comprises a plurality of orifices 156 which form a tight seal around the tube section 152 of the heater 148. As such, when each of the heaters 148 is installed along with the gasket 146, each of the bores 134 is sealed by virtue of the seal plate 136 beneath and the gasket 146 above.

The second layer 104 is then placed on top of the third layer 106 such that each of the through bores 125 is aligned with a respective through bore 134. As such, each of the through bores 125 has part of an air heater tube section 125 contained therein.

The first gasket 144 is placed on top of the second layer 104. The first gasket 144 comprises a series of orifices 158 which are substantially wider than the sections 152 of the heaters 148 such that the through bores 125 are upwardly open.

The first layer 102 is stacked onto the second layer 104 such that each of the chambers 118 is aligned with a respective through bore 125. As such, the through bores 125 and the chambers 118 are each in fluid communication with each other.

The peripheral fluid chamber 160 is arranged to surround mould tool face 110 (shown only on the right-hand side of the mould tool) and is in conductive contact with the exterior surfaces of peripheral wall 114, first gasket 144 and block 124. Port 169 of interior chamber 163 is aligned with the exhaust ports 130 of the second layer 104. As such, the combination of second layer 104 and peripheral fluid chamber 160 provides an exhaust functionality as will be described below.

As will be seen in FIG. 1, when assembled the outlet 154 of the tube section 152 ejects proximate the temperature control surface 112 of the first layer 102.

Each of the gaskets 144, 146 is constructed from a thermally insulating material. The material has a thermal conductivity lower than the material used to construct the layers 102, 104. As such, conduction between the first layer 102 and the second layer 104 is minimised.

Similarly, conduction between the second layer 104 and the third layer 106 is minimised due to the second gasket 146. In addition, because the orifices 156 form a tight seal around the tube sections 152 of the heaters 148, no passage of fluid between the through bore 125 and through bores 134 is permitted. As such, heat transfer by way of conduction and convection is not permitted between the second layer 104 and the third layer 106.

Following impingement of the fluid on to the temperature control surface 112 of the first layer, the fluid passes from each chamber 118 of the first layer 102 to the chambers 125 of the second layer 104 via the open ends 116 as shown by dashed arrow 170. The fluid then passes along the second layer 104, under pressure, through the internal ports 128, gradually mixing in the process. The fluid then exits the second layer 104 via exhaust port 130 as shown by dashed arrow 171, entering the interior chamber 163 of the peripheral fluid chamber 160 via port 169. As the fluid is under pressure it is forced along interior chamber 163 towards the tool surface 110, whereupon the fluid subsequently is routed back down the peripheral fluid chamber 160 via exterior chamber 164, as shown by dashed arrow 172. Valve 166 controls the exhaust of the fluid from the exterior chamber to exit the mould 100 at exhaust port 167, as indicated by dashed arrow 174.

The existence of exhaust fluid proximate the exterior surfaces of peripheral wall 114, first gasket 144 and block 124 of the mould tool 100 reduces the temperature differential between the mould tool 100 and the surrounding atmosphere. The insulating effect of the peripheral fluid chamber therefore reduces the heat loss in this region.

Figure 2:
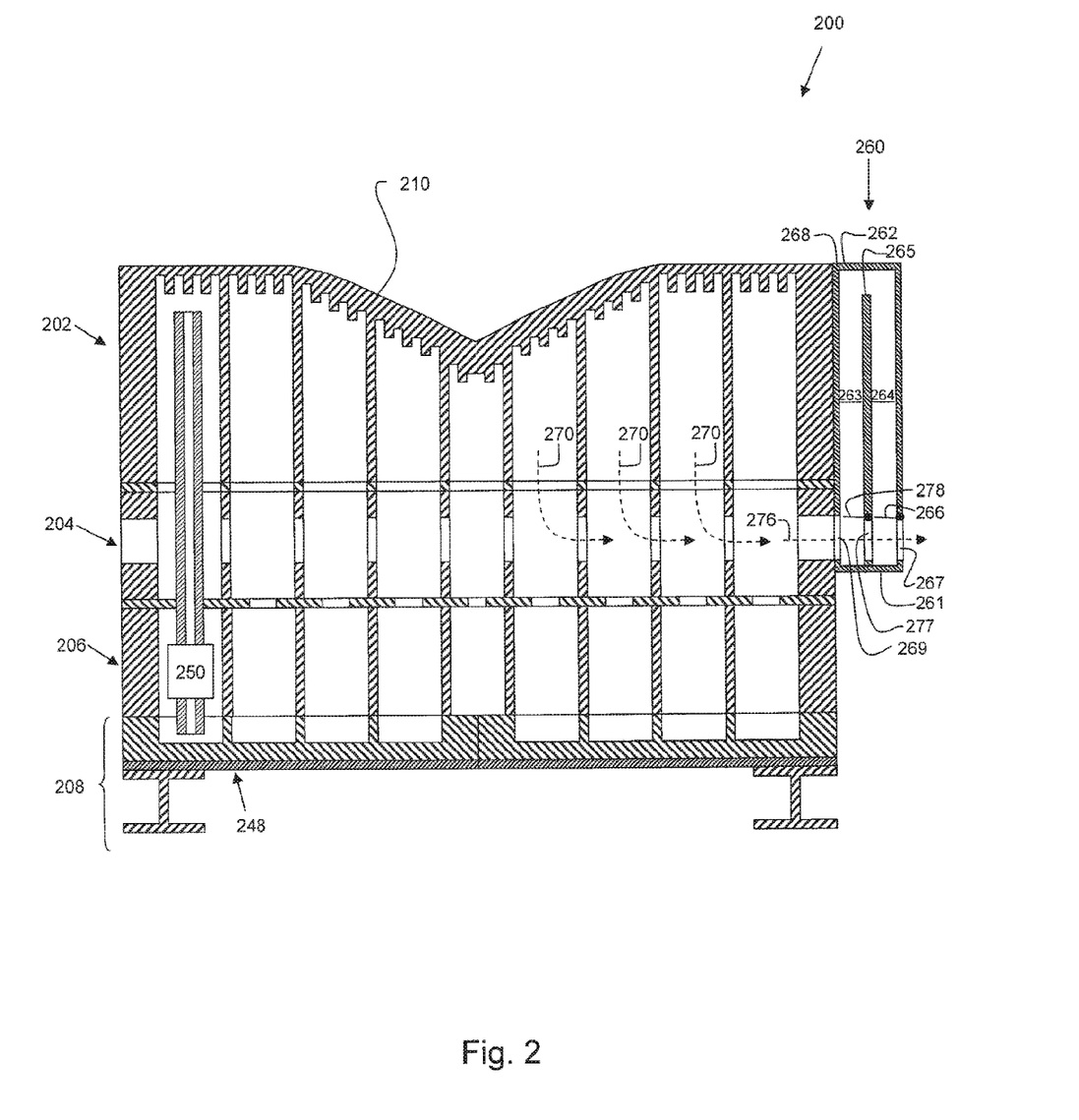
FIG. 2 is a schematic view of a second embodiment of a mould tool heat management system in accordance with the present invention.

Turning to FIG. 2, a similar mould tool 200 to FIG. 1 is shown with like reference numerals designating similar components. Only inline air heater 248 is shown in detail. The main difference between the tools 100 and 200 is the arrangement of peripheral fluid chamber 260 of tool 200 compared to that of peripheral fluid chamber 160 of tool 100.

Peripheral fluid chamber 260 further comprises port 277 arranged in the internal wall 265 positioned proximate first end 161, substantially in line with ports 267 and 269. Bypass valve 278 is mounted in port 277.

The presence of bypass valve 278 in internal wall 265 prevents fluid exiting the second layer 204 via exhaust port 230 from being directed towards the tool surface 210, and instead the fluid passes along the bottom wall 261 of the fluid chamber 260 and exits the mould 200 directly at exhaust port 267 as indicated by dashed arrow 276. External valve 266, mounted in port 267 deflects inwardly to prevent any exhaust flow from being directed towards the tool surface 210 via exterior chamber 264.

The ability to control the delivery of exhaust fluid to the region of the peripheral fluid chamber 260 which is proximate the exterior surfaces of peripheral wall 114, first gasket 144 and block 124 of the mould tool 100, allows greater control of the insulating effect of the peripheral fluid chamber 260 and in particular, allows hot exhaust fluid to be "dumped" directly to the atmosphere when a lower temperature is demanded at the tool face 210 following a period of higher temperature demand.

Figure 3:
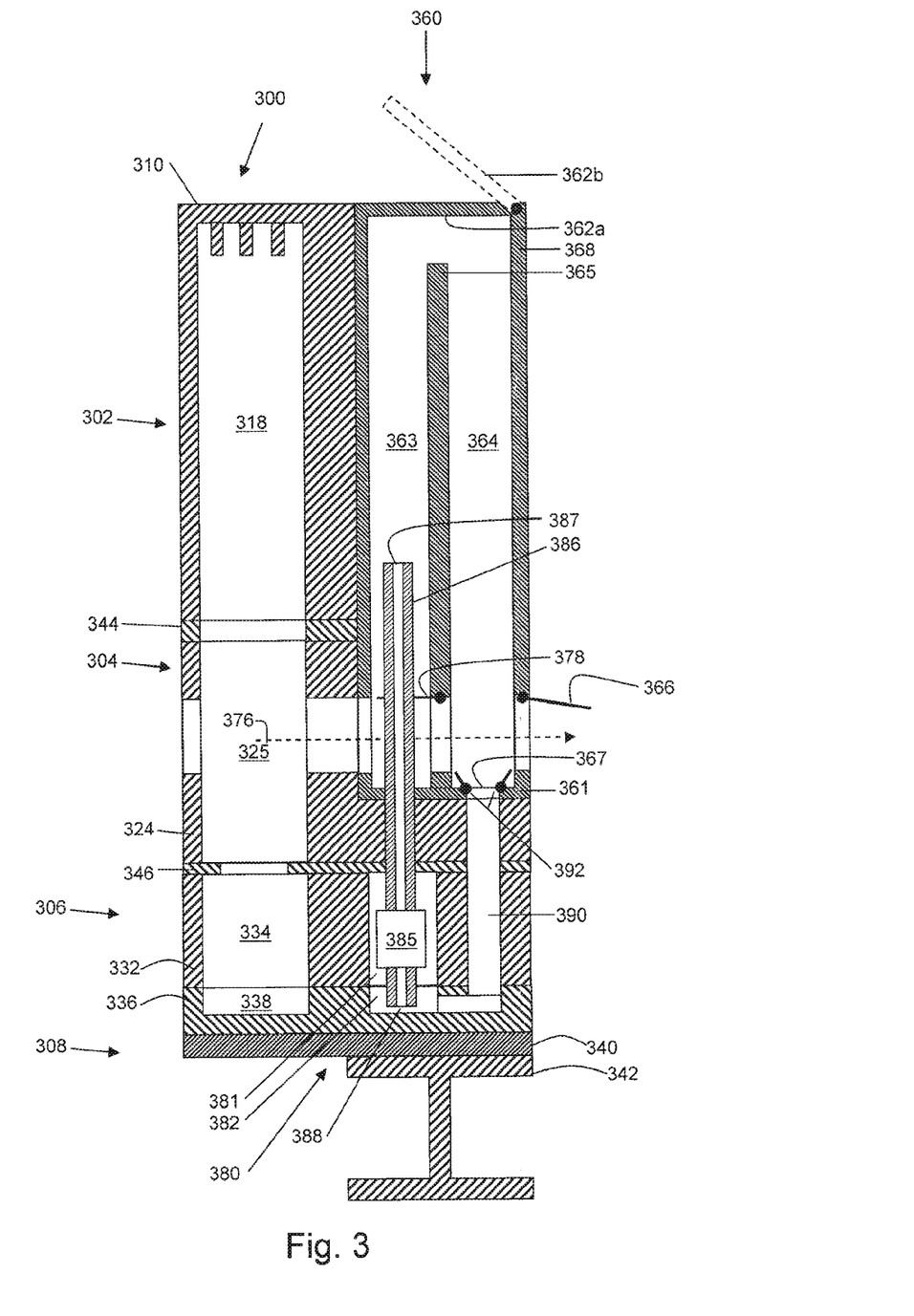
FIG. 3 is a partial schematic view of a third embodiment of a mould tool heat management system in accordance with the present invention.

In FIG. 3, a similar mould tool 300 to FIGS. 1 and 2 is shown in partial section view, with like reference numerals designating similar components. Only the right hand chambers/bores 318, 325, 334, 338 of the first, second, third and support layers 304, 306, 308 are shown, along with the peripheral fluid chamber 360.

Firstly, peripheral fluid chamber 360 has been modified such that first end 362 defines a waste-gate which is moveable between a closed position 362a and an open position 362b.

Mould tool 300 has been laterally extended such that peripheral fluid chamber 360 is incorporated into the peripheral wall 314 of the first layer 302 and the upper part of the block 324 of the second layer 304.

The lower part of the block 324 of the second layer 304, the third layer 306 and the support assembly 308 are extended beneath peripheral fluid chamber 360 in mould tool 300.

Third layer 306 further comprises four through bores 381 arranged one in each corner of the mould tool 300. Each of the through bores 381 contains mounting apparatus for an inline air heater (as will be described below).

The support assembly further comprises four blind bores 382 defined in the four corners of sealing plate 336.

The third layer 306 is mounted to the support plate 336 such that each of the four through bores 381 align with a respective blind bore 382 of the seal plate.

Four additional inline heaters 380 are provided having inlets 388, heater assemblies 385, elongate tube sections 386 and outlets 387. The heater assemblies 385 are mounted within the third layer 306 with through bore 381, one in each corner of mould tool 300. Elongate tube section 386 passes through gasket 346, through part of block 324 of the second layer 304 and through the first end 361 of peripheral fluid chamber 360. Outlet 387 is arranged to deliver fluid from the heater assembly 385 into the interior chamber of 363, in the direction of the tool face 310.

Furthermore, port 367 located at the second end 362 of the exterior chamber 364 of the peripheral fluid chamber and conduit 390 connects the exterior chamber 364 of the peripheral fluid chamber 360 to the blind bore 382 of sealing plate 336 such that the peripheral chamber 360 and inline heater 380 may be in fluid communication. A further valve 392 is positioned within port 367 and regulates the exhaust flow feed to the inline heater 380.

The arrangement allows four beneficial modes of operation.

Firstly, when additional heat energy is demanded in the region of the mould tool face 310, in addition to the routing of exhaust from chamber 318 within the first layer (valve 378 being closed) to the interior chamber 363, the heater assembly 385 may be operated to augment the heat delivered to interior chamber 363.

Alternatively, when it is required to cool the mould tool face 310, in addition to the routing of exhaust from chamber 318 directly from the tool as shown by dashed arrow 376 (valve 378 being open as shown in FIG. 3) the heater assembly 385 may be operated to deliver cool air to the interior chamber 363. In this case valve 366 would open (as shown in FIG. 3) to ensure control of pressure within peripheral chamber 360.

If very rapid cooling is required, the waste-gate may be placed in the open position 362b initially, and the heater assembly 385 may be operated to "blast out" the residual hot air contained within the interior chamber 363 and facilitate radiation of heat from the block 314 of the first layer.

Alternatively, when it is required to maintain the temperature of the mould tool face 310, or effect a lower magnitude temperature ramp-up as compared to the first mode of operation, in addition to the routing of exhaust from chamber 318 within the first layer 302 (valve 378 being closed) to the interior chamber 363, exhaust fluid exiting the exterior chamber 364 may be re-routed back through the inlet 388 of in-line heater 380 via conduit 390, effectively allowing recycling of the exhaust fluid.

To ensure pressure management in the peripheral fluid chamber it will be necessary to provide exhaust of some of the fluid to the atmosphere even when the peripheral fluid chamber is operated in its exhaust recycling mode.

It will be noted that any of the embodiments of FIGS. 1 to 3 are suitable for use with a double sided tool.

Figure 4:
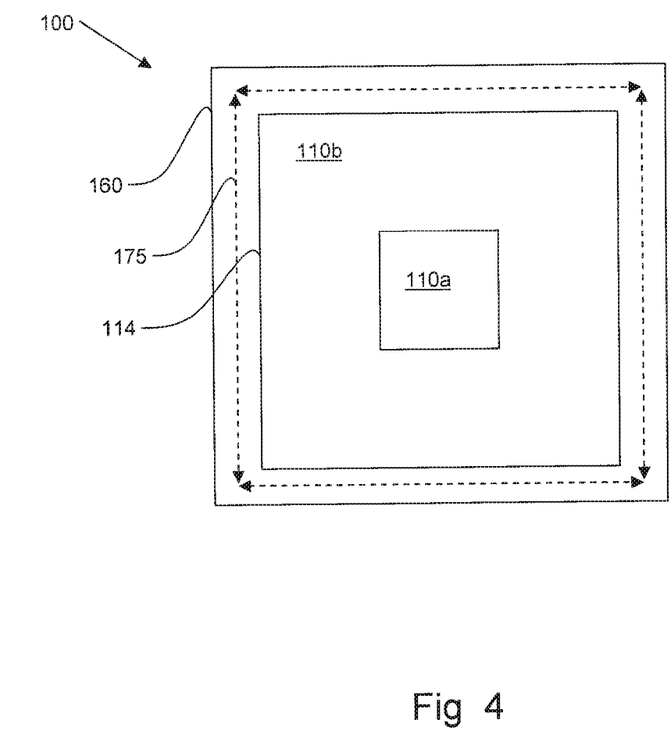
FIG. 4 is a plan view of the mould tool heat management system of FIG. 1.

In FIG. 4, the mould tool 100 of FIG. 1 is shown in plan view. The mould face side of the mould tool is visible, and is divided into two zones comprising: a central zone 110a and an edge zone 110b. Exhaust flow within the fluid chamber 160 is shown by dashed arrows 175.

Figure 5:
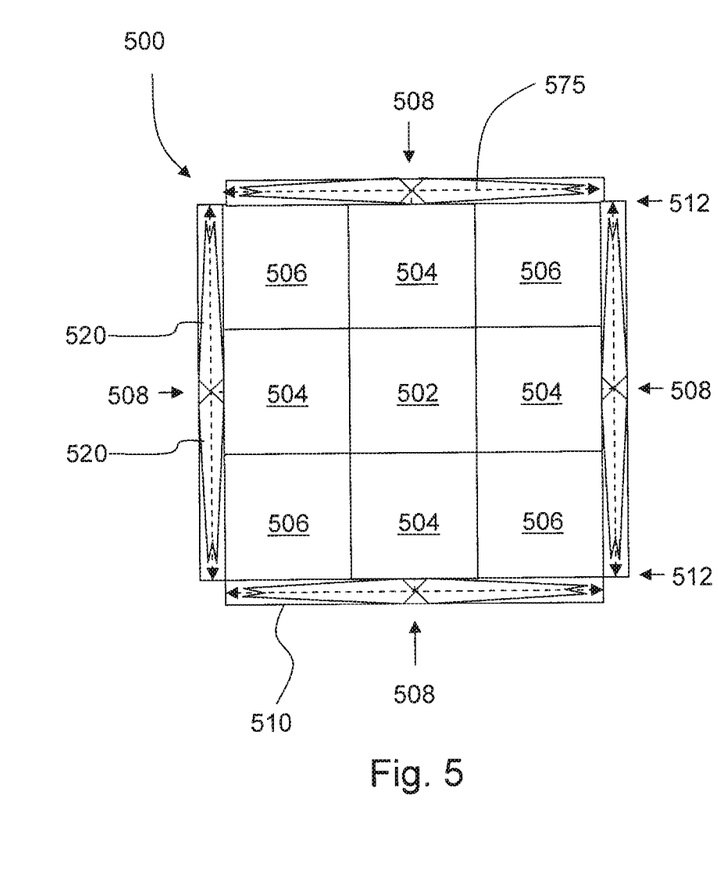
FIG. 5 is a plan view of a fourth embodiment of a mould tool heat management system in accordance with the present invention.

Turning to FIG. 5, a plan view of a mould tool 500 is shown. The mould face side of a mould tool is visible, and is divided into nine zones comprising: a central zone 502, four mid side zones 504 and four corner zones 506.

Each zone is individually fluid heated, as described above. Specifically, each zone has a fluid chamber in contact with a temperature control face of the mould tool, opposite the mould face side. Each zone also has an exhaust, which is in fluid communication with an exhaust layer situated on an opposite side of the fluid chamber to the mould face (i.e. not visible in FIG. 5). The exhaust layer is a large plenum chamber spanning the tool.

The exhaust chamber has four exits 508, each at the midpoint of the tool below the mid side zones. Four fluid chambers in the form of conduits 510 extend around the outer lateral surface of the tool. The conduits 510 are in contact with the edges of the tool (i.e. across the thickness of the tool between the mould face and the temperature control face). The conduits may also be at least partially in contact with the fluid chambers of each zone. Each conduit is in thermal contact with one side of a mid side zone 504, and a side each of two corner zones 506. The conduits exhaust at either end 512 of the corner zones. The passage of fluid within the conduits 510 is indicated by dashed arrows 575.

Each conduit 510 is in fluid communication with an exit 508 of the exhaust layer, such that exhausted hot fluid is used to increase the temperature at the periphery of the tool zones above ambient. This reduces the difference in temperature between these zones and the surrounding environment, and therefore less heat is lost through convection. Each conduit 508 includes a pair of gutters 520 which are arranged to extend from the lower centre of the conduit adjacent the exit 508 of the exhaust layer, upwards and outwards towards the corner zones. The gutters encourage the exhaust flow upwards and towards the corner zones 506 where heating is most needed.

Figure 6:
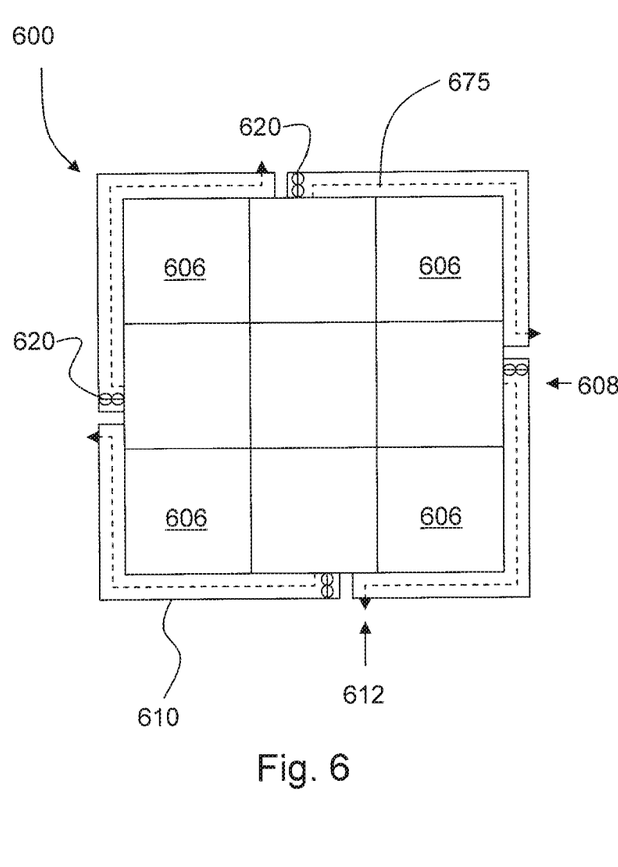
FIG. 6 is a plan view of a fifth embodiment of a mould tool heat management system in accordance with the present invention.

Turning to FIG. 6, a similar tool 600 is shown to the tool 500, but in this case four conduits 610 each surround two sides of a corner zone 606, and exhaust at a point 612 on an adjacent side to an exhaust exit 608.

A fan 620 is arranged adjacent each exhaust exit 608 to facilitate fluid flow around the corner zones 606, from the exhaust exit 608 to the conduit exhaust 612.

Figure 7:
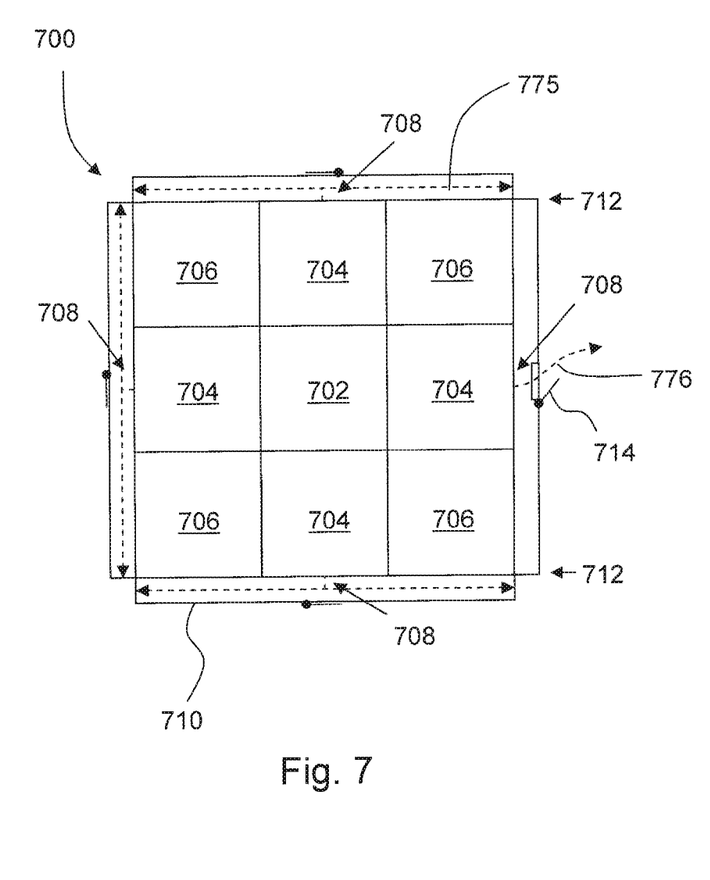
FIG. 7 is a plan view of an sixth embodiment of a mould tool heat management system in accordance with the present invention.

Turning to FIG. 7 a similar tool 700 is shown to the tool 600. The mould face side is divided into nine zones comprising: a central zone 702, four mid side zones 704 and four corner zones 706. The exhaust chamber has four exits 708 into conduits 710. Exits are provided at 712.

The conduits 710 further comprise cooling exhaust valves 714 proximate each exit 708. When the tool 700 is being heated, the valves 714 remain closed (as shown on the left, top and bottom sides of FIG. 7). Therefore the exhaust flow passes over the sides of the zones 704 to the exits 712. The passage of fluid within the conduits 710 is indicated by dashed arrows 775.

When the tool 700 is being cooled, it is desirable to exhaust as much heat as possible. Therefore it is no longer desirable to insulate the outside of the tool using the conduits 710. As shown on the right hand side of FIG. 7, the exhaust valves 714 open in the cooling mode to exhaust directly without passing the exhaust fluid past the tool. The passage of fluid within the conduit 710 in this case is indicated by arrow 776.

It is envisaged that the valves 714 operate by remote control from the tool control system (each valve may be operated by a motor). Alternatively, when the tool 700 is being cooled, fluid pressure in the exhaust chamber increases. As such, the valves 714 may be resiliency biased closed, such that they open at a predetermined pressure in the conduits 710. Therefore their action becomes automatic. The exhaust valves of the tool 700 may be positioned on the exhaust chamber such that the exhaust fluid does not reach the conduits 710.

This type of exhaust valve could also be applied to the embodiment of FIG. 5. The valves described within the embodiments of the invention may take the form of, but are not limited to: bi-metallic, vent, or louvre activated by a solenoid.

The peripheral fluid chamber may be run at above atmospheric pressure to benefit from the known mass flow advantages.

Variations of the above embodiments fall within the scope of the present invention. The use of the gutter and fan are not restricted only to the embodiments described, and it is envisaged that further fluid manipulating devices could be used such as pumps.

The invention claimed is:

1. A mould tool comprising:
   a plurality of fluid chambers each having an exhaust;
   a first layer comprising:
      a peripheral wall at least partially surrounding the plurality of fluid chambers so as to define an enclosed volume;
   a workpiece profile surface, the workpiece profile surface defining a workpiece profile having a periphery; and
   a temperature control surface opposite the workpiece profile, the temperature control surface at least partially bounding the plurality of fluid chambers;
   a second layer at least partially surrounding the plurality of fluid chambers, the second layer having at least one exhaust port in fluid communication with the exhausts of the plurality of fluid chambers;
   a support assembly;
   a third layer adjacent the second layer, the third layer being mounted to the support assembly;
   a plurality of first fluid-based temperature control assemblies mounted within the third layer, the plurality of first fluid-based temperature control assemblies being configured to control the temperature of the mould tool by directing fluid into respective fluid chambers of the plurality of fluid chambers; and
   at least one peripheral chamber arranged outside the periphery of the workpiece profile to surround the workpiece profile surface and in conductive contact with at least one exterior surface of the peripheral wall of the first layer, the at least one peripheral chamber being fed by the at least one exhaust port of the second layer, wherein the at least one peripheral chamber is configured to urge a fluid flow from the at least one exhaust port of the second layer in a direction of the workpiece profile to reduce a temperature differential between the plurality of fluid chambers and a surrounding atmosphere, the at least one peripheral chamber comprising an external wall, a base and an internal wall, the internal wall extending from the base to just short of the workpiece profile surface, creating two side-by-side chambers in fluid communication with one another.

2. A mould tool according to claim 1, wherein the mould tool is divided into a plurality of zones, the plurality of zones comprising a central zone and an edge zone, wherein the plurality of first fluid-based temperature control assemblies are configured to control the temperature of the central zone, and wherein the at least one peripheral chamber is proximate the edge zone.

3. A mould tool according to claim 2, wherein the at least one exhaust port of the second layer comprises a plurality of exhaust ports, and wherein the at least one peripheral chamber comprises a plurality of peripheral chambers, each of the plurality of peripheral chambers being in fluid communication with a respective exhaust port of the second layer, the plurality of peripheral chambers being disposed proximate the edge zone.

4. A mould tool according to claim 3, wherein the plurality of peripheral chambers are disposed substantially along each side of the edge zone.

5. A mould tool according to claim 3, wherein the plurality of peripheral chambers are disposed proximate a corner of two adjacent sides of the edge zone.

6. A mould tool according to claim 1, wherein the at least one peripheral chamber defines a waste-gate in a region of the workpiece profile surface.

7. A mould tool according to claim 1, further comprising a flow diverter disposed in the internal wall of the at least one peripheral chamber and configured to influence the fluid flow from the at least one exhaust port of the second layer to selectively at least partially bypass at least part of the at least one peripheral chamber.

8. A mould tool assembly according to claim 7, wherein the flow diverter is configured to substantially prevent flow of the fluid from the at least one exhaust port of the second layer towards the workpiece profile surface.

9. A mould tool according to claim 7, wherein the flow diverter comprises a valve.

10. A mould tool according to claim 9, wherein the valve is responsive to at least one of a flow, pressure and temperature of the fluid flow from the at least one exhaust port of the second layer.

11. A mould tool according to claim 10, wherein the valve is configured to increase bypass flow upon a rise in the flow rate and/or pressure of the fluid flow from the at least one exhaust port of the second layer.

12. A mould tool according to claim 1, further comprising at least one second fluid-based temperature control assembly disposed in the at least one peripheral chamber.

13. A mould tool according to claim 12, wherein fluid flow from the at least one exhaust port of the second layer is re-routed to an inlet of the at least one second fluid-based temperature control assembly.

14. A mould tool according to claim 12, wherein the at least one peripheral chamber defines four corners and wherein the at least one second fluid-based temperature control assembly comprises four second fluid-based control assemblies, and one of the four second fluid-based control assemblies is arranged in each corner of the at least one peripheral chamber.

15. A method of managing the temperature of a mould tool, comprising:
providing a mould tool comprising:
a plurality of fluid chambers each having an exhaust;
a first layer having:
a peripheral wall surrounding the first layer so as to define an enclosed volume;
a workpiece profile surface, the workpiece profile surface defining a workpiece profile having a periphery; and
a temperature control surface at least partially bounding the plurality of fluid chambers;
a second layer at least partially surrounding the plurality of fluid chambers, the second layer having at least one exhaust port in fluid communication with exhausts of the plurality of fluid chambers;
a support assembly;
a third layer adjacent the second layer, the third layer being mounted to the support assembly;
a plurality of first fluid-based temperature control assemblies mounted within the third layer, the plurality of first fluid-based temperature control assemblies being configured to control a temperature of the mould tool by directing fluid into the respective fluid chambers; and
at least one peripheral chamber disposed outside the periphery of the workpiece profile to surround the workpiece profile surface and in conductive contact with at least one exterior surface of the peripheral wall of the first layer, the at least one peripheral chamber comprising an external wall, a base and an internal wall, the internal wall extending from the base to just short of the workpiece profile surface, creating two side-by-side chambers in fluid communication with one another;
providing a workpiece in contact with the workpiece profile surface;
controlling the temperature of the mould tool by directing fluid into the plurality of fluid chambers using the plurality of first fluid-based temperature control assemblies;
feeding the at least one peripheral chamber with fluid from the at least one exhaust port of the second layer; and
urging the fluid flow from the at least one exhaust port of the second layer in a direction of the workpiece profile to reduce a temperature differential between the plurality of fluid chambers and a surrounding atmosphere.

16. A method of managing the temperature of a mould tool according to claim 15, further comprising:
heating and/or cooling the fluid between the plurality of first fluid-based temperature control assemblies and the at least one peripheral chamber.

17. A method of managing the temperature of a mould tool according to claim 15, further comprising:
pumping the fluid between the plurality of first fluid-based temperature control assemblies and the peripheral chamber.

18. A method of manufacturing a moulded component comprising the method claim 15 and the step of using the mould tool to mould a component.

19. A mould tool comprising:
a plurality of fluid chambers each having an exhaust;
a first layer comprising:
a peripheral wall at least partially surrounding the plurality of fluid chambers so as to define an enclosed volume;
a workpiece profile surface, the workpiece profile surface defining a workpiece profile having a periphery; and
a temperature control surface opposite the workpiece profile, the temperature control surface at least partially bounding the plurality of fluid chambers;
a second layer at least partially surrounding the plurality of fluid chambers, the second layer having at least one exhaust port in fluid communication with the exhausts of the plurality of fluid chambers;
a support layer;
a third layer adjacent the second layer, the third layer being mounted to the support assembly;
a plurality of first fluid-based temperature control assemblies mounted within the third layer, the plurality of first fluid-based temperature control assemblies being configured to control the temperature of the mould tool by directing fluid into respective fluid chambers of the plurality of fluid chambers, and
at least one peripheral chamber arranged outside the periphery of the workpiece profile to surround the workpiece profile surface and in conductive contact with at least one exterior surface of the peripheral wall of the first layer, the at least one peripheral chamber being fed by the at least one exhaust port of the second layer, wherein the at least one peripheral chamber is configured to urge a fluid flow from the at least one exhaust port of the second layer in a direction of the workpiece profile to reduce a temperature differential between the plurality of fluid chambers and a surrounding atmosphere, the at least one peripheral chamber comprising an external wall, a base and a gutter, the gutter extending between the external wall and the periphery of the workpiece profile and running from a lower center of the base of the peripheral chamber upwards and towards a corner between two adjacent sides of an outer edge of an edge zone of the periphery of the workpiece profile.

* * * * *